June 7, 1938.　　A. J. DREMEL　　2,119,986
ELECTRIC MOTOR
Filed Aug. 6, 1936　　2 Sheets-Sheet 1
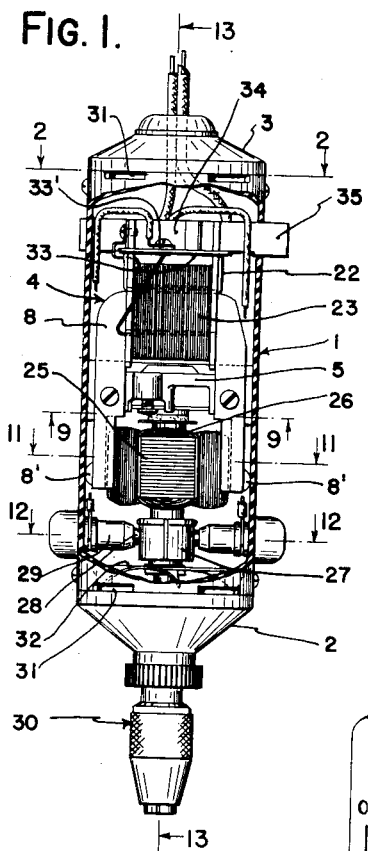
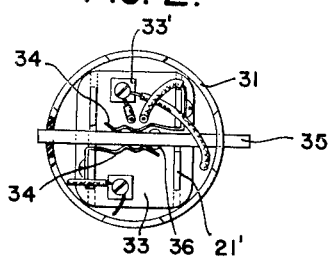
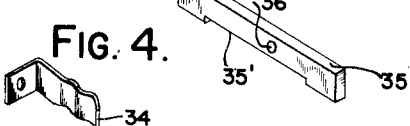
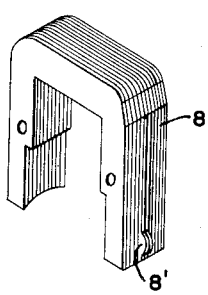
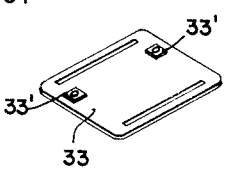
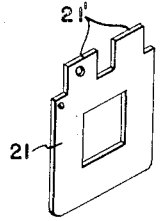
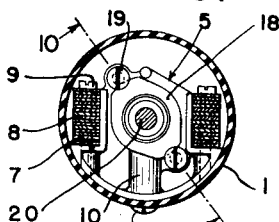
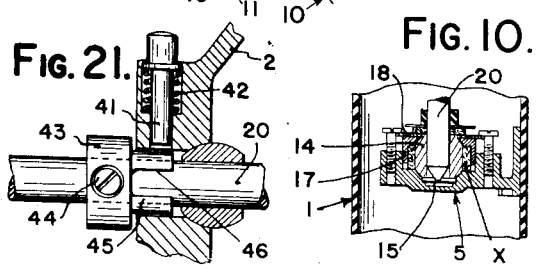
INVENTOR
ALBERT J. DREMEL
BY
ATTORNEYS June 7, 1938.  A. J. DREMEL  2,119,986
ELECTRIC MOTOR
Filed Aug. 6, 1936    2 Sheets-Sheet 2

INVENTOR
ALBERT J. DREMEL
BY
ATTORNEYS

Patented June 7, 1938

2,119,986

UNITED STATES PATENT OFFICE 2,119,986

ELECTRIC MOTOR

Albert J. Dremel, Racine, Wis.

Application August 6, 1936, Serial No. 94,596

7 Claims. (Cl. 172—36)

This invention pertains to improvements in electric motors, and more particularly to a motor, capable of being held in the hand for operating small tools, hair clippers, razors, and the like.

The invention has primarily for its object the provision of an exceedingly light, compact, sturdy, and comparatively inexpensive motor of maximum power, in which simple and efficient means is provided for cooling the motor, and at the same time preventing dust and dirt from the work from entering the casing and accumulating on the armature.

Incidental to the foregoing, a more specific object of the invention is to provide a motor mounted within a casing through which air is circulated from the rear of the casing, past the motor, and expelled at the forward end.

In connection with the foregoing, it is also an important object to provide means for cooling the forward bearing of the armature shaft, independently of the cooling of the motor.

Another specific object incidental to the foregoing is the provision of unitary means mounted upon the forward end of the armature shaft, rearwardly of its forward bearing, for partitioning the casing and independently circulating air therethrough upon opposite sides of the partition.

A still further object resides in the provision of a simple, inexpensive, and at the same time effective switch for most conveniently controlling the motor circuit.

A still further important object of my invention is the provision of novel means for holding the shaft against turning movement, whereby to facilitate the association and removal of tools with and from the shaft.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings are illustrated several forms of the physical embodiment of the present invention constructed according to the best mode so far devised for the practical application of the principles thereof.

In the drawings:

Figure 1 is an elevation of a motor constructed in accordance with one form of the present invention, a portion of the casing being broken away to more clearly illustrate structural features of the motor.

Figure 2 is a rear end view taken on the line 2—2 of Figure 1, with the rear cap removed.

Figure 3 is a perspective view of the switch bar.

Figure 4 is a similar view of one of the switch contact fingers.

Figure 5 is a perspective view of the plate to which the line and motor wires are connected.

Figure 6 is a perspective view of the laminated motor core.

Figure 7 is a perspective view of one of the side plates mounted on the core, and confining the field coil.

Figure 8 is a perspective view of a clip for holding the rear ends of the side plates, shown in Figure 7, in fixed position while the field coil is being wound.

Figure 9 is a transverse section taken on the line 9—9 of Figure 1.

Figure 10 is a fragmentary section taken on the line 10—10 of Figure 9.

Figure 21 is an enlarged, fragmentary detail section illustrating the releasable means employed for holding the armature shaft against turning movement when tools are being associated therewith or removed therefrom.

Figure 11:
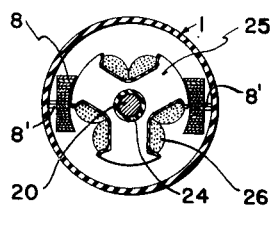
Figure 11 is a transverse section taken on the line 11—11 of Figure 1.
Figure 12:
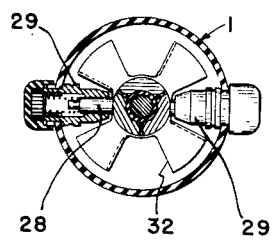
Figure 12 is a similar view taken on the line 12—12 of Figure 1.

Referring now more particularly to the accompanying drawings, the invention, as illustrated, is designed for use in connection with small hand tools, such as grinders, cutters, drills, buffers, and so forth, but the salient features of the invention are readily applicable to other uses, such as hair clippers, razors, and so forth. Therefore, it is to be understood that in referring to tools, it is meant to include all devices to which the motor may be applied.

In a motor of the present type, which is held in the hand of the operator in performing fine, accurate work, compactness, lightness, and balance are essential. Other important items are cost, power, speed, durability, and accessibility to the motor for repair or replacement of parts.

The present invention, which is designed to meet all of the foregoing requirements, comprises a tubular shell, designated by the numeral 1, and preferably formed from fibrous composition material, because of cheapness and lightness, and also such material serves as an insulator. The ends of the tube are provided with detachable front and rear caps 2 and 3, respectively. A motor, designated generally by the numeral 4, is mounted within the casing by means of a bracket 5, which comprises an arcuate base 6 terminating in lateral shoulders 7 upon which the arms of a laminated yoke core 8 are secured by the screws 9. Projecting upwardly from the base 6 the bracket is provided with a boss 10 for reception of a hollow screw 11 inserted through the casing 1 to secure the bracket in position. The boss 10 is provided with an orifice 12, in alinement with the opening in the screw 11, which permits lubrication of the armature shaft bearing carried by the bracket 5, and to be hereinafter described. Obviously, more than one boss 10 and one screw 11 can be utilized, if so desired.

As best shown in Figures 13 to 19, the bracket 5 is provided with a spherical recess 13, into which a spherical bearing block 14 is positioned, and disposed between the block 14 and the bracket is a thrust disc 15. A retaining collar 17 is inserted over the outer end of the bearing block 14, and is held in position by a flared washer 18, which is secured to the bracket 5 by screws 19. A felt washer, positioned between the bearing block 14 and the retaining collar 17, serves to hold lubricant within the bearing, and at the same time permits universal movement of the bearing block, making it self-alining with the armature shaft 20.

Mounted on the cross head of the core yoke 8, and abutting the side arms, are a pair of plates 21, which are held against spreading at the rear end by a clip 22. The usual field coil 23 surrounds the core between the plates 21.

An insulating sleeve 24 is secured on the armature shaft 20, and carries the usual laminated spider 25 for the armature winding 26. Also, a conventional commutator 27 is secured on the sleeve 24, and is engaged by the brushes 28, detachably carried by suitable housings 29 secured to the casing 1.

The forward end of the armature shaft 20 projects through the forward cap 2, and is journaled in a bearing 40, identical with that carried by the bracket 5 for supporting the rear end of the armature shaft. In the present application of the invention, the projecting forward end of the armature shaft has secured thereon a chuck 30 for reception of various tools, such as heretofore mentioned.

Figure 14:
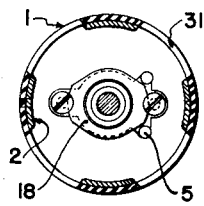
Figure 14 is a transverse section taken on the line 14—14 of Figure 13.
Figure 13:
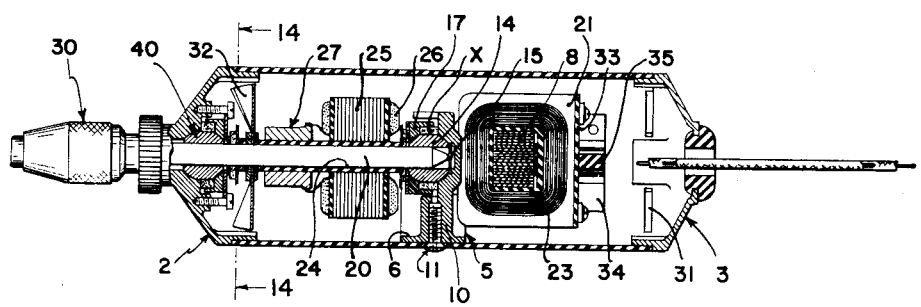
Figure 13 is a longitudinal section taken on the line 13—13 of Figure 1.
Figure 15:
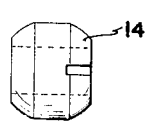
Figure 15 is an elevation of one of the armature shaft bearing blocks.
Figure 16:
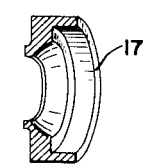
Figure 16 is a sectional view in perspective of one of the bearing block retaining collars.
Figure 17:
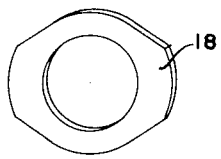
Figure 17 is a perspective view of the retaining plate for the collar shown in Figure 16.
Figure 18:
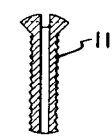
Figure 18 is a sectional view of the screw for assembling the motor within the casing.
Figure 19:
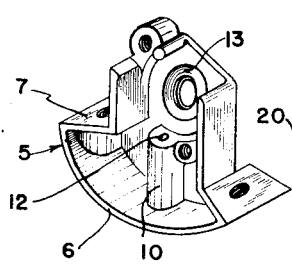
Figure 19 is a perspective view of the motor-supporting bracket.

Referring particularly to Figures 1, 2, and 14, it will be noted that the casing 1 is provided with annularly spaced slots 31 at both its rear and forward ends, and secured upon the armature shaft, intermediate the forward bearing 40 and the commutator 27, is an impeller 32, the blades of which are set to draw air through the rear openings 31, and expel the same through the forward openings 31, thus effectively cooling the entire motor. Inasmuch as the air passing through the casing enters at the rear, instead of the forward end, which is the customary method of cooling motors of the present type, dust and dirt from the work is dispelled by the air discharged through the forward openings 31, and because the inlet openings at the rear of the casing are spaced a substantial distance from the work, practically no dust or dirt enters the casing to accumulate and foul the commutator and brushes.

In connection with the circulation of air through the casing, attention is directed to the fact that the arms of the yoke core 8 are slightly spaced from the side of the casing 1, to allow the passage of air therebetween, and are held against lateral shifting movement by means of teats 8', formed upon one or more of the intermediate laminations, and engaging the casing.

Considering now the novel form of switch embodied in the present invention, reference will be had to Figures 1 to 4, inclusive, and Figure 7. As best shown in Figure 7, the plates 21 are provided with rearwardly extending fingers 21', over which the connector plate 33, best shown in Figures 2 and 5, is mounted. This plate is provided with suitable terminals 33', to which the line wires and those from the motor are attached.

Also, secured to the diagonally opposite fingers 21' of the plates 21, as best shown in Figure 2, are spring contact fingers 34, between which a switch bar 35 of insulating material is disposed, the switch bar being provided with a notch 35', which provides shoulders for engagement with the plate 33, to limit the lateral movement of the switch bar 35. The switch bar 35 is provided with a contact pin 36, which serves as a connector between the contact fingers 34 when the switch bar is in one position, to close the motor circuit. In the opposite position of the switch bar, as shown in Figure 2, the bar serves as an insulator between the contact fingers, and the motor circuit is then open.

The ends of the switch bar 35 project through opposed slots in the casing 1 to provide convenient manipulation of the switch by merely shifting the same transversely of the casing. Obviously, the slots in the casing prevent longitudinal shifting of the switch bar 35 with relation to the casing, and, therefore, hold the bar in proper position between the contact fingers 34. It will also be noted that the switch bar 35 is disposed between the spaced fingers 21' of the side plates 21.

From the foregoing explanation, considered in connection with the accompanying drawings, it will be seen that an exceedingly light, compact, and comparatively inexpensive motor has been provided for hand use, and due to the novel method provided for cooling, the serious objection heretofore encountered, namely, accumulation of dirt within the casing and consequent fouling and wear on the motor, is reduced to a minimum.

Also, due to the design of the motor, and the location of mounting within the casing, a perfectly balanced structure is obtained that is essential to accurate work, and which also prolongs the life of the tools, in that the operator can better gauge and control pressure of the tool on the work.

Aside from simplicity, the novel switch provided for controlling the motor circuit has the added advantage of convenient and easy manipulation.

Lastly, the method of mounting the entire motor upon a single bracket, rigidly secured to the casing by one screw, results in simplicity and low cost of manufacture, in that expensive assembling operations are entirely eliminated. Furthermore, by the present construction, accessibility to the motor for the purpose of repair or replacement of parts is materially facilitated.

Figure 20:
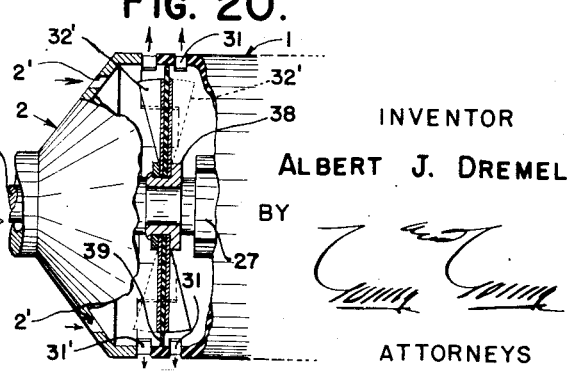
Figure 20 is a fragmentary elevation of a modified form of the present invention, with parts broken away and in section to more clearly illustrate structural details.

In instances where the invention is applied to exceptionally heavy work, it has been found that there is a tendency for the front bearing 40 and cap 2 to become overheated, due to the fact that more or less of a pocket is formed at the forward end of the casing, and the air circulated through the casing past the motor is heated, and does not sufficiently contact the front bearing and cap to cool the same. Therefore, in order to overcome the foregoing condition it is proposed to employ that form of the invention illustrated in Figure 20, in which a ferrule 38 is secured upon the armature shaft between the forward bearing and commutator.

Mounted upon the ferrule is a partition disc 39, disposed between two impellers 32', also carried by the ferrule. Obviously, the disc 39, which is of substantially the same diameter as the interior of the casing, serves to partition the same, and while the rear impeller functions in the same manner as in that form of the invention heretofore described, the impeller positioned at the forward side of the disc 39 serves to draw air through the openings 2' in the cap 2, and expel the same through the openings 31' in the casing, thus circulating air through the forward part of the casing independently of that for cooling the motor, and at the same time, preventing the entrance of dust and dirt from the work into the motor compartment. This arrangement effectively prevents over-heating of both the front bearing and cap. Here attention is also directed to the fact that the thrust disc 15 for the rear end of the armature shaft materially reduces friction, and, therefore, heating of the rear bearing and adjacent parts of the motor.

In operating the chuck for holding the tools, it is decidedly advantageous to hold the shaft 20 against rotation, and in Figure 21 I have illustrated one preferred type of means for releasably engaging the shaft. This means can include a finger-operated plunger 41 carried by the front end of the cap 2, and this plunger is normally held away from the shaft by an expansion spring 42 coiled about said plunger.

The shaft 20 can be provided with suitable grooves or recesses, so that upon the depressing of the plunger by the finger against the tension of the spring, the plunger can engage in any one of the grooves or recesses, and thus firmly lock the shaft with the casing.

As illustrated, a collar 43 is secured on the shaft by the use of a suitable set screw 44, and this collar has formed thereon a sleeve 45 which extends into the cap 2. The sleeve, at spaced points, is provided with slots 46 for the reception of the inner end of the plunger.

While the invention has been illustrated and described in considerable detail, it is to be understood that some of the elements embodied therein are more or less conventional, and, therefore, form no part of the invention other than in the combination hereinafter set forth in the claims. It is also contemplated that various changes may be made in the structural details without departing from the invention, as for instance, the partition disc 39, instead of being rotated by the armature shaft and impellers, may be stationary within the casing, and produce the same results.

I claim:

1. A device of the character described comprising, a closed casing provided with spaced front and rear openings, a bracket secured within said casing intermediate said openings, a universal type electric motor positioned within the casing, the motor armature shaft being journaled in said bracket at one end and projecting forwardly from the motor for connection with a working implement, the motor field coil being mounted upon said bracket, and means for drawing air into the casing through its rear openings and expelling the same through the forward openings.

2. A device of the character described comprising, a closed casing provided with spaced front and rear openings, a single bracket mounted within said casing intermediate said openings and secured thereto by means passing through said casing and accessible exteriorly thereof, an electric motor positioned within the casing, the motor armature shaft having one end journaled in said bracket and extending forwardly for connection with a working implement, the motor field coil being mounted upon said bracket and means for drawing air into the casing through its rear openings and expelling the same through the forward openings.

3. A device of the character described comprising, a closed casing provided with spaced front and rear openings, a single bracket secured within said casing intermediate said openings, an electric motor field core mounted upon said bracket, projections on the said core for engaging the inner wall of the casing to prevent lateral shifting of the bracket and field core, an armature shaft journaled in said bracket projecting forwardly for connection with a working implement, and means for drawing air into the casing through its rear openings and expelling the same through the forward openings.

4. A device of the character described comprising, a closed casing provided with spaced front and rear openings, a single bracket secured within said casing intermediate said ends and provided with spaced lateral shoulders, a yoke core having its arms supported upon said shoulders and secured to said bracket, a field coil surrounding the cross head of said yoke core, an armature shaft having one end journaled in said bracket and projecting forwardly for connection with a working implement, an armature and a commutator mounted on said shaft, the commutator being positioned forwardly of the armature, and means mounted on said armature shaft forwardly of the commutator for drawing air into the casing through its rear openings past said motor and expelling the same through the forward openings.

5. A device of the character described comprising, a closed casing provided with spaced front and rear openings, a single bracket within said casing provided with spaced lateral shoulders, removable means passing through said casing securely holding the bracket thereto, a yoke core having its arms supported upon said shoulders and secured to said bracket, projections on the arms of said core for engaging the casing, a field coil surrounding the cross head of said yoke core, an armature shaft having one end journaled in said bracket and projecting forwardly for connection with a working implement, an armature and a commutator mounted on said shaft, the commutator being positioned forwardly of the armature, and an impeller mounted on said armature shaft forwardly of the commutator for drawing air into the casing through its rear openings past said motor and expelling the same through the forward openings.

6. A device of the character described comprising, a casing, an electric motor mounted within said casing, spaced contact fingers carried by said motor, a notched switch bar of insulation material positioned between said fingers and projecting through the sides of said casing for lateral shifting, the shoulders of said notch engaging said motor to limit the movement of said switch bar and a contact carried by said bar for engagement with said fingers in one position of the bar to close the motor circuit.

7. An electrically driven hand tool comprising, a casing, a motor in said casing including a shaft extending beyond and journaled in the forward end of the casing, means on the forward end of the shaft for receiving appliances to be operated by said shaft, manually operated releasable means for locking the shaft to the casing against rotation, said means including a spring-pressed plunger carried by the casing closely adjacent the shaft bearing, and keeper means directly secured on the motor shaft and journaled therein adjacent the shaft bearing for receiving the plunger.

ALBERT J. DREMEL.